United States Patent
Hofmann et al.

[15] 3,689,151
[45] Sept. 5, 1972

[54] MICROFILM FLOW TYPE APPARATUS

[72] Inventors: Wilfried Hofmann, Munich; Josef Pfeifer, Unterhaching, both of Germany

[73] Assignee: Agfa-Gevaert AG, Leverkusen, Leverkusen, Germany

[22] Filed: April 15, 1970

[21] Appl. No.: 28,611

[30] Foreign Application Priority Data

April 4, 1969 Germany..........P 19 19 013.7

[52] U.S. Cl. .........................355/64, 355/14, 355/50
[51] Int. Cl. ..............................................G03b 27/32
[58] Field of Search...........................355/14, 50, 64

[56] References Cited

UNITED STATES PATENTS 2,461,185  2/1949  Schubert ....................355/64

*Primary Examiner*—John M. Horan
*Attorney*—Arthur O. Klein

[57] ABSTRACT

An apparatus for scanning a succession of sheets which are transported through a scanning station; the scanning apparatus is useful, for example, in the reproduction of the material on such sheets on microfilm. A first driven transport means conducts the sheets to the scanning station; a second driven transport means conducts them away from such station. The two transport means are driven by a common motor which is under the control of a novel circuit means which stops the motor if a sheet, having been grasped and conveyed by the first transport means, fails to reach the second transport means within a predetermined time interval thereafter. The circuit also provides for the control of the film transport of an associated camera, and for the counting of sheets passing through the apparatus.

6 Claims, 3 Drawing Figures

MICROFILM FLOW TYPE APPARATUS

The invention relates to a microfilm flow type apparatus having a picture-scanning window in the scanning plane of the apparatus and transport means for the carriers of the subject matter which is to be scanned. The invention will be disclosed principally in connection with its use with a flow type camera, although its use is obviously not restricted thereto.

Microfilm cameras operating under the continuous flow principle usually include means which grasp the subject matter or sheet which is to be reproduced after it has been inserted into the machine and transport this sheet into a plane where it is being photographed. After the sheet has passed through the photographic plane, it is seized by a second transport system and is moved out of the microfilm camera. In the photographic plane itself the sheet to be photographed is normally guided by means of a pair of transparent plates. Damaged sheets or staples, which have inadvertently not been removed from the sheets, frequently jam the guide means of the camera. All the material which follows in the apparatus, for example the sheets which are fed by an automatic feeder into the machine, are then also jammed and may be considerably damaged by mashing and may even be partially destroyed.

The apparatus in accordance with the illustrative embodiment of the invention has switching means mounted along the path followed by the sheet traversing the picture window being scanned by the camera. A first switch activates a delay member of a relay, and a second switch interrupts a pulse which is started by the first switch. The delay period of the delay member corresponds at least to the period it takes for the travel of the sheet between the two switches.

In this arrangement according to the invention the relay is energized as soon as the time of travel of the sheet between the two switches exceeds the exact predetermined interval which it should normally take, plus a predetermined tolerance. Any type of disturbances occurring in the transport means of the camera, no matter what the source of the disturbance is, is detected with great accuracy.

In the illustrative embodiment, the relay when energized, stops the motor driving the sheet traverse or feeding means. It is, of course, also possible to have the relay actuate an optical or acoustical signal which would indicate to persons servicing the microfilm camera that they should undertake certain measures. The avoidance of damage to the sheets to be photographed can be even more effectively accomplished with greater security when the relay, as indicated above, is a magnetic relay which de-energizes the sheet transport means by means of a circuit governed by the magnetic relay. In the illustrative embodiment, the circuit for the magnetic relay has a first switching means which is closed when the sheet to be photographed has reached a predetermined point along its pass through the microfilm camera. The circuit is furthermore provided with a second switch and a time-delayed electronic switch, said second switch being opened when the sheet reaches a second point along its path through the microfilm camera. The time-delay electronic switch has a time-delay RC circuit connected in parallel to the magnetic relay, the R-C circuit activating the electronic switch after both the first and second switch have remained closed for a predetermined time.

According to a further feature of the invention, the electronic switch includes in a known manner a controlled rectifier having a control electrode, the control electrode of the rectifier being connected to the base of a unijunction transistor, the emitter of which is connected to the RC circuit and the second base of which is connected to the second switch. The use of a controlled rectifier, such as a thyristor, makes it possible to make the circuit particularly compact and efficient. The use of an RC circuit as well as a unijunction transistor controlled by the second switch, makes it possible to discharge the condenser quickly between the working cycles without additional discharge switches or the like.

A particularly simple arrangement for a microfilm flow type camera which is free from malfunctioning results when the magnetic relay is disposed in the circuit of the main drive motor for the sheet transport means and when the film transport driving means of the camera are provided with a magnetic clutch which is controlled by means of the first switch.

Since the second switch fails to open only when a sheet fails to pass it in the required time interval, it is possible, according to a further advantageous feature of the invention, to provide this second switch with a counter to count the number of photographs taken without malfunctioning of the device.

The accompanying drawings show one non-limiting embodiment of the invention by way of example.

Figure 1:
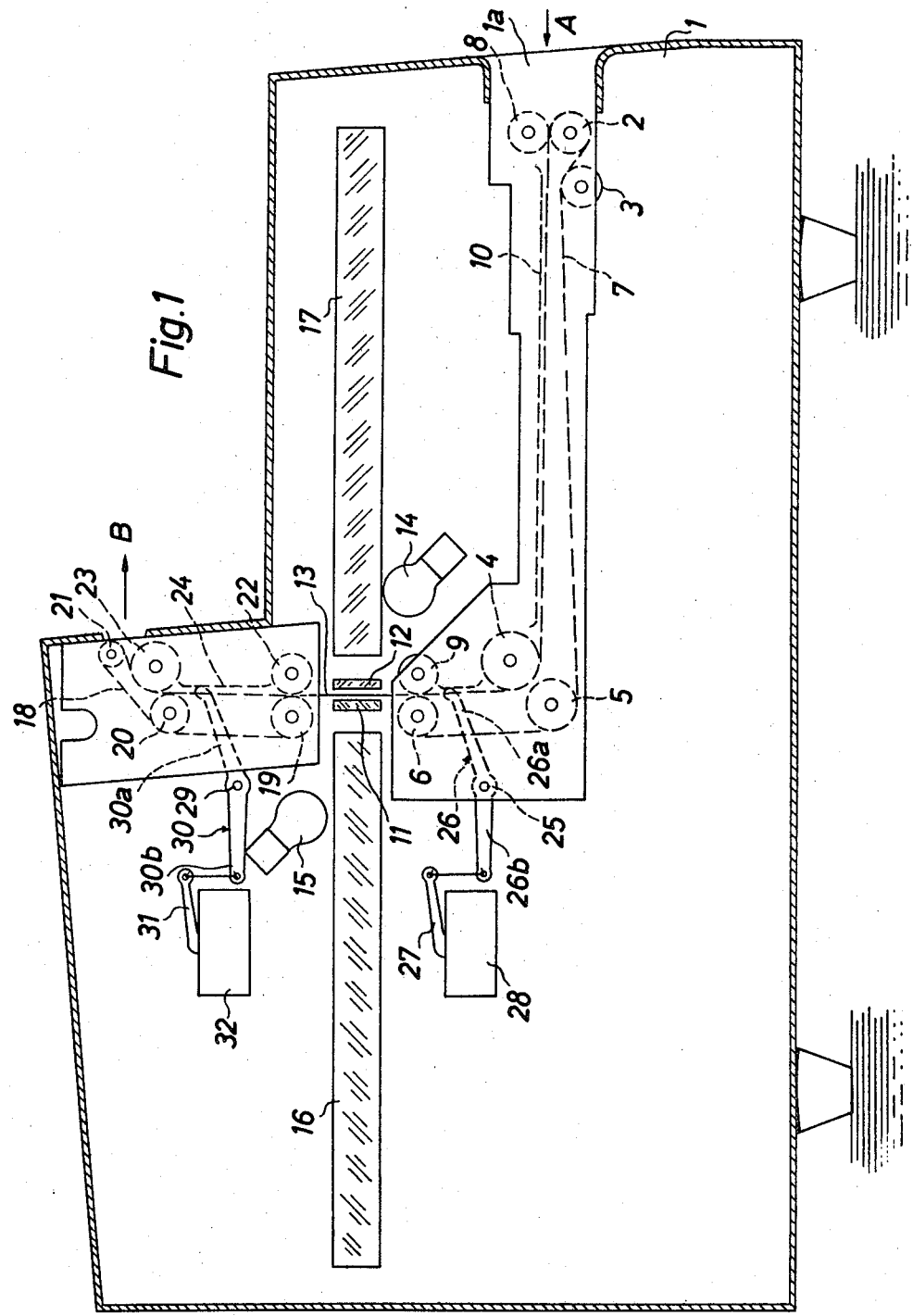
FIG. 1 is a somewhat schematic view, partially in vertical longitudinal section and partially in side elevation, of an apparatus which scans a sheet on both sides as the sheet is carried therethrough, said apparatus being adapted for use with a microfilm flow type camera.

In FIG. 1 there is illustrated a housing for the scanning mechanism of the invention, said housing also serving to house camera apparatus, not particularly shown. Housing 1 has an input opening 1a through which a sheet 13 to be scanned and reproduced may be inserted in the direction of the arrow A. After the sheet has been introduced, it is seized by a first endless belt 7 which is entrained around guide rollers 2, 3, 5, 6 and 4, and is driven in the direction shown. The sheet is moved on the upper horizontal run of belt 7 beneath a horizontal guide plate 10, the sheet being diverted from a horizontal path to a vertical one at roll 4 where it passes between the belt and the roll. After leaving the zone of rollers 6, 9 the sheet 13 travels upwardly between two glass plates 11 and 12 which form the picture window of the camera. One or more of the guide rollers 2 to 6 inclusive, or the transport rollers 8 and 9 which press against the belt 7 and guide rollers 2 and 6, respectively, are connected in a known manner to a motor 33, which in this embodiment drives both the sheet transport mechanism and the associated flow type camera. The sheet 13 is illuminated on both sides in the picture windows 11, 12 by means of a row of lamps 14, 15. There are provided usual mirror arrangements 16 and 17, which are conventional in microfilm flow type cameras for the simultaneous photographing of both sides of a sheet in a microfilm camera. As above noted, the camera has not been illustrated in detail in the drawings.

After the sheet 13 has traversed the picture windows 11, 12, it is taken up by parallel endless transport bands 18 which are mounted around the rollers 19, 20 and 21. Confronting and pressing against the bands 18 at rollers 19, and 20, 21, respectively there are transport rollers 22 and 23, which with a guide member 24 aid in the upward transporting of the sheet. By means of this second sheet transport arrangement, the sheet 13 is moved in the direction of the arrow B out of the camera.

A first sheet detecting means is mounted in advance of the scanning station defined by the picture windows 11, 12 through which the sheet 13 passes. Such first sheet detecting means comprises a feeler 26 pivotally mounted on a shaft 25, the feeler being in the form of a first-class lever having a first arm 26a which extends into the plane of the path taken by the sheet as it travels to the scanning station. The second arm 26b of the feeler 26 is connected with an actuating lever 27 of a first microswitch 28. Microswitch 28 is normally open, being closed only when a sheet 13 engages feeler 26a.

A second sheet detecting means is mounted downstream of the scanning station defined by the picture windows 11, 12. Such second sheet detecting means comprises a feeler 30 pivotally mounted on a shaft 29, the feeler being in the form of a first-class lever having a first arm 30a which extends into the plane of the path taken by the sheet as it travels away from the scanning station. The second arm 30b of the feeler 30 is connected with an actuating lever 31 of a second microswitch 32. Microswitch 32 is normally closed, being opened only when a sheet 13 engages feeler 30a.

Figure 2:
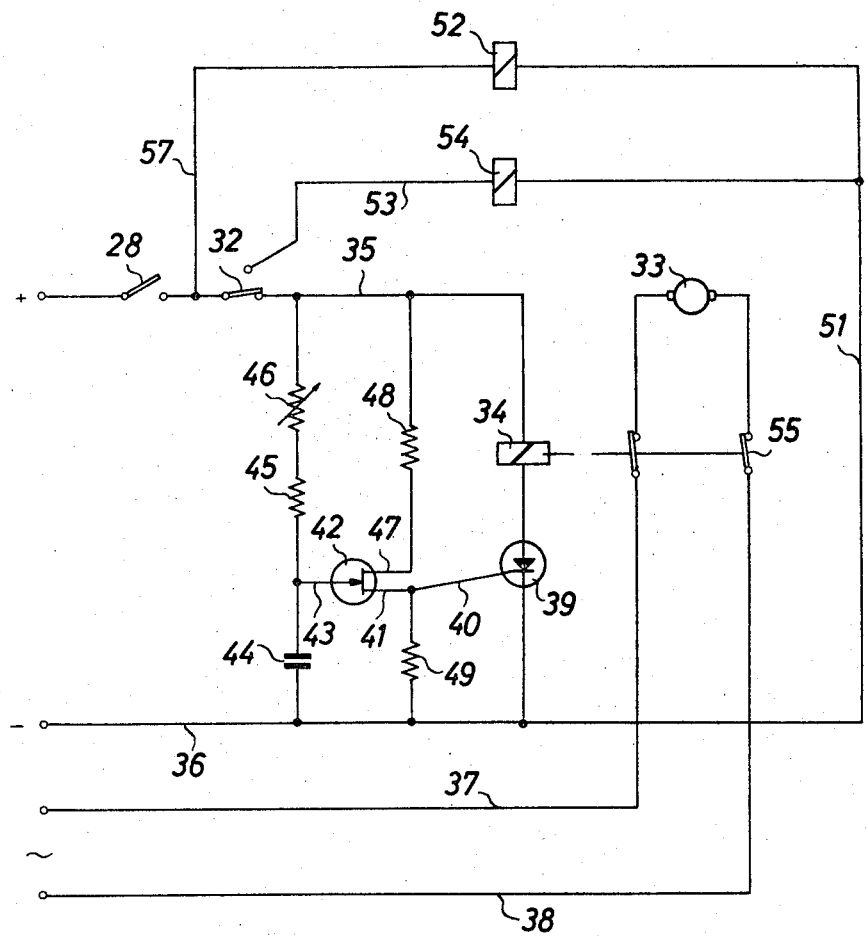
FIG. 2 is a circuit diagram of the apparatus in accordance with the invention.

As shown in FIG. 2, microswitches 28 and 32 are incorporated in a circuit for energizing the coil of a magnetic relay 34 which controls the on and off switching of the motor 33 for driving the sheet scanning mechanism, above described, and the film transport of a microfilm flow type camera with which the scanning mechanism is associated.

The magnetic relay 34 is energized by a DC power source which is connected to the relay by means of conductor wires 35 and 36, microswitches 28 and 32 being interposed in series in wire 35. The drive motor 33 is connected by means of conductor wires 37 and 38 to an AC source of power, movable normally closed contacts 55, 55a under the control of relay 34 being interposed in wires 37 and 38, respectively. Contacts 55, 55a are closed when relay 34 is de-energized, and are opened when relay 34 is energized.

A thyristor 39 has its anode connected to relay 34 as shown, the cathode of the thyristor being connected to the negative side of the DC power source through wire 36. The thyristor has a control or gate electrode 40; the thyristor is non-conductive, and thus the relay 34 is de-energized, unless the control electrode 40 is at a predetermined potential which is positive with respect to the cathode. Under such condition, the thyristor becomes conductive, the coil of relay 34 is energized, and contacts 55, 55a are opened to stop motor 33. The circuit shown in FIG. 2 includes circuit means, now to be described, which render control electrode 40 positive with respect to the cathode of the transistor only after a sheet 13, having closed microswitch 28, fails to open microswitch 32 within a predetermined time interval.

A unijunction transistor 42 has its first base 41 connected to negative conductor 36 through a resistor 49. The second base 47 of transistor 42 is connected to the positive wire 35 through a resistor 48. The transistor 42 becomes conductive between bases 41 and 47 when its emitter 43 has a predetermined positive potential with respect to base 41. Under such condition, the transistor 42 becomes conductive. The control electrode 40 of thyristor 39 is connected to base 41 of transistor 42, as shown. Because of resistor 49, when transistor 42 conducts, the control electrode 40 of thyristor 39 is at a higher potential than the cathode of the thyristor, and thus the thyristor becomes conductive. It will thus be seen that the thyristor, which is able to carry quite substantial currents, functions as a switch, being under the control of the transistor 42, which handles much smaller currents. The transistor 42 is, in turn, controlled by a time delay circuit, now to be described.

Connected across wire 36 and wire 35 downstream of switch 32 is a time-delay circuit having a variable resistor 46, a fixed resistor 45, and a condenser 44. When both switches 28 and 32 are closed, condenser 44 begins to charge, the rate of charging being governed by the values of resistors 45, 46. Only after the positive terminal of condenser 44 reaches a predetermined potential does the emitter 43 of transistor 42 reach a sufficient positive potential for transistor 42 to become conductive between bases 41 and 47.

A wire 57 is connected to wire 35 downstream of switch 28 but upstream of switch 32. Wire 57 is connected to one terminal of the coil 52 of a magnetic clutch which is interposed in a drive train (not shown) between motor 33 and the film transport mechanism (not shown) of the associated microfilm flow camera. The other terminal of coil 52 is connected to wire 36 through a wire 51. The switch 32 is of the double-pole type; the second pole, which is normally open but is closed when the pole connected to wire 35 is open, is connected by a wire 53 to one terminal of the coil 54 of a counter relay, the other terminal of the coil 54 being connected to wire 51.

The operation of the entire arrangement is as follows: During the initial state of the apparatus, the main switch 55, 55a of the drive motor 33 is closed and the motor is running. When no sheet 13 is in the apparatus, the switch 28 is open, whereas the switch 32 is closed. As soon as a sheet 13 is inserted in the direction of the arrow A into the driven sheet transport means 2 to 9 and reaches the scanning station 11, 12 the feeler 26a is lifted, thereby closing the microswitch 28. The relay 34, as a consequence of this, is energized, thereby to open contacts 55, 55a, unless a circuit to coil 34 is cut-off by means of the thyristor 39. The thyristor is, however, made conductive only after a predetermined time delay, which is adjusted by varying the resistance 46, by means of the RC member 45, 44 and the unijunction transistor 42, as soon as, due to the closing of the switch 28 and the charging of the condenser 44, the control electrode 43 receives a positive potential of a sufficient magnitude. The premature decay of this potential via the resistance 49 is prevented due to the positive potential which is imposed on the second base 47.

If a sheet 13 passes the scanning station 11, 12 in a normal, orderly way, thereby opening the feeler 30a of the microswitch 32 before the completion of the charging of the condenser 44, the energizing circuit for the relay 34 is interrupted before the thyristor 39 becomes conductive. The condenser 44 then discharges via the base 41 and the resistance 49, so that the circuit resumes its initial state, ready for the next cycle.

As indicated above, relay 34 may also operate an audible and/or visible signal to give notice to the operator of abnormal operation of the sheet transport mechanism. Such audible and/or visible signal may be employed in place of or in addition to the movable contacts 55, 55a which stop the motor 33. Also, when the solenoid of the relay 34 has an appreciable distance of travel between the position in which contacts 55, 55a are closed to that in which they are open, the repositioning of the solenoid plunger and contacts gives a visual signal of abnormal operation of the transport mechanism when relay 34 is de-energized.

Figure 3:
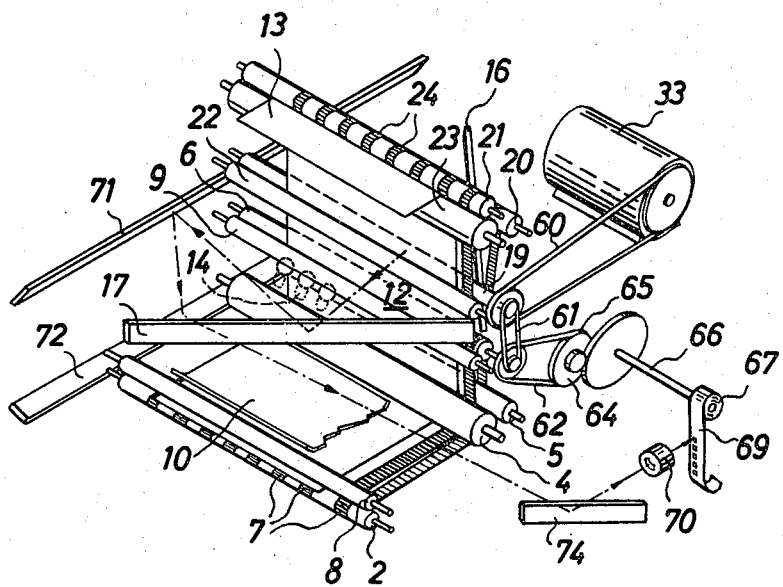
FIG. 3 is a fragmentary view in perspective of a camera incorporating the scanning apparatus of FIGS. 1 and 2.

A camera incorporating the scanning apparatus of FIGS. 1 and 2 is fragmentarily shown in perspective in FIG. 3. The motor 33 drives the roller 19 through the medium of a belt 60 entrained over pulleys, as shown. The roller 6 is driven from the roller 19 by the means of a belt 61 and pulleys on the roller shafts. A belt extends from a pulley on the shaft of roller 6 to an electromagnetic clutch 64 which includes the above-disclosed clutch coil winding 52. A driving mechanism 65, which includes the electromagnetic clutch 64, drives a shaft 66 which is driven by means of a pinion and a larger gear in mesh therewith, the driving mechanism being driven when the coil 52 of the clutch 64 is energized. Roll film 69, which is entrained over a sprocket or roller 67, is advanced at the requisite speed to be exposed to copy a sheet or original 13 progressing through the scanner.

The sheet 13 is illuminated, as above-described, by a bank of lamps 14 which illuminate the forward face of the sheet. A similar bank of lamps, of which one is shown at 15 in FIG. 1, is disposed to illuminate the rear surface of the sheet, there being means including the elongated mirror 16 for photographing such rear surface of the sheet. The means for photographing the rear surface is similar to that, now to be described, for photographing the forward face of the sheet.

Light reflected from the forward surface of the sheet 13 impinges upon the elongated angularly disposed mirror 17 and is reflected therefrom to a canted elongated upper mirror 17 at one side of the apparatus. The mirror 71 is tipped, as shown, so as to reflect the thus received light downwardly upon a lower elongated tipped mirror 72. Light is reflected from mirror 72 across the apparatus, as indicated, and is received upon a canted mirror 74 which forwards it to an objective lens 70 of the camera, the lens 70 having its focus in the plane of the film 69.

Although the invention is illustrated and described with reference to one preferred embodiment thereof, it is to be understood that it is in no way limited to the disclosure of such a preferred embodiment but is capable of numerous modifications within the scope of the appended claims.

What is claimed is:

1. Apparatus for scanning a plurality of sheets which are fed in succession through the apparatus, comprising driven transport means for moving sheets to be scanned through a scanning station, a first sheet detector positioned upstream of the scanning station, a second sheet detector positioned downstream of the scanning station, said transport means normally moving the leading end of a sheet from the first to the second detector in a predetermined first time interval, and signal means operative when a given second time interval at least slightly greater than the first time interval elapses between passage of the leading end of a sheet from the first to the second sheet detector, and a control circuit, means for energizing the control circuit, wherein the first and second sheet detector include series connected first and second switches, respectively, the signal means includes a relay having a coil selectively energized by the control circuit, a third, normally open switch in the control circuit, and time delay circuit means for closing the third switch to energize the relay coil at the end of said second time interval, said second time interval starting at the first instant that both the first and second switches are closed during the handling of said sheet by the sheet transport means.

2. Apparatus according to claim 1, wherein the first switch is normally open and is closed by the passage of a sheet past the first sheet detector, and the second switch is normally closed and is opened by the passage of a sheet past the second sheet detector.

3. Apparatus according to claim 2, comprising a DC source for the control circuit and wherein the third switch has a control electrode which selectively renders the third switch conductive, and the time delay circuit means includes an RC circuit having a series connected resistance and condenser connected in parallel with the relay coil and to the control electrode of the third switch.

4. Apparatus according to claim 3, wherein the third switch is a thyristor, and comprising a unijunction transistor having its first base electrode connected to the negative side of the control circuit and its second base electrode connected to the positive side of the control circuit, the emitter of the unijunction transistor being connected to the positive side of the condenser in the RC circuit.

5. Apparatus according to claim 1, comprising means to count the number of sheets passing through the scanning station, and means actuated by the second sheet detector for operating the sheet counter.

6. Apparatus according to claim 1, comprising means which measures the elapsed time following passage of the leading end of a sheet by the first sheet detector, and wherein the signal means is rendered operative by the elapsed time measuring means when a given second time interval at least slightly greater than the first time interval elapses between passage of the leading end of a sheet from the first to the second sheet detector.

* * * * *